(12) United States Patent
Ryan et al.

(10) Patent No.: US 6,869,103 B2
(45) Date of Patent: Mar. 22, 2005

(54) APPARATUS AND METHOD FOR CONTROLLING AN INFLATABLE CUSHION

(75) Inventors: Shawn G. Ryan, Dayton, OH (US); Steven A. Damian, Springboro, OH (US)

(73) Assignee: Delphi Technologies, Inc., Troy, MI (US)

( * ) Notice: Subject to any disclaimer, the term of this patent is extended or adjusted under 35 U.S.C. 154(b) by 131 days.

(21) Appl. No.: 10/318,913

(22) Filed: Dec. 13, 2002

(65) Prior Publication Data

US 2004/0113404 A1 Jun. 17, 2004

(51) Int. Cl.$^7$ .............................................. B60R 21/16
(52) U.S. Cl. .................................................. 280/743.2
(58) Field of Search .................................... 280/743.2

(56) References Cited

U.S. PATENT DOCUMENTS

| | | | |
|---|---|---|---|
| 5,489,119 A | 2/1996 | Prescaro et al. | |
| 5,887,894 A | 3/1999 | Castagner et al. | ....... 280/743.2 |
| 6,161,866 A | 12/2000 | Ryan et al. | |
| 6,203,061 B1 | 3/2001 | Niederman et al. | |
| 6,213,502 B1 | 4/2001 | Ryan et al. | |
| 6,247,726 B1 | 6/2001 | Ryan | |
| 6,371,517 B1 | 4/2002 | Webber et al. | |
| 6,390,501 B1 | 5/2002 | Greib et al. | ............. 280/743.2 |
| 6,409,213 B2 | 6/2002 | Webber et al. | ............... 280/739 |
| 6,422,597 B1 | 7/2002 | Pinsenschaum et al. | ..... 280/735 |
| 6,431,596 B1 | 8/2002 | Ryan et al. | |
| 6,439,603 B2 | 8/2002 | Damman et al. | |
| 6,454,300 B1 | 9/2002 | Dunkle et al. | .............. 280/742 |
| 6,499,765 B2 | 12/2002 | Hawthorn et al. | |
| 6,511,094 B2 | 1/2003 | Thomas et al. | ........... 280/743.2 |
| 6,561,545 B2 | 5/2003 | Greib et al. | |
| 6,592,146 B2 | 7/2003 | Pinsenschaum et al. | |
| 6,616,184 B2 | 9/2003 | Fischer | ..................... 280/743.2 |
| 2001/0035637 A1 | 11/2001 | Thomas et al. | |
| 2002/0158456 A1 | 10/2002 | Fischer | ..................... 280/743.2 |
| 2004/0051285 A1 | 3/2004 | Fischer | ........................ 280/739 |

FOREIGN PATENT DOCUMENTS

| | | | |
|---|---|---|---|
| DE | 3618060 | 12/1987 | ........... B60R/21/28 |
| DE | 10152139 A1 | 5/2002 | |

OTHER PUBLICATIONS

Copy of European Search Report for Application No. EP 03 07 8728.

*Primary Examiner*—Paul N. Dickson
*Assistant Examiner*—Laura B. Rosenberg
(74) *Attorney, Agent, or Firm*—Scott A. McBain

(57) ABSTRACT

An airbag module, having a housing; an inflatable cushion being stored in an un-deployed position in the housing; an inflator for inflating the inflatable cushion, the inflator being in fluid communication with the inflatable cushion; a tension device; a tether element being secured to the inflatable cushion at one end and the tension device at the other; the tension device applies tension to the tether after the inflatable cushion is inflated to a first configuration by the inflator.

17 Claims, 10 Drawing Sheets

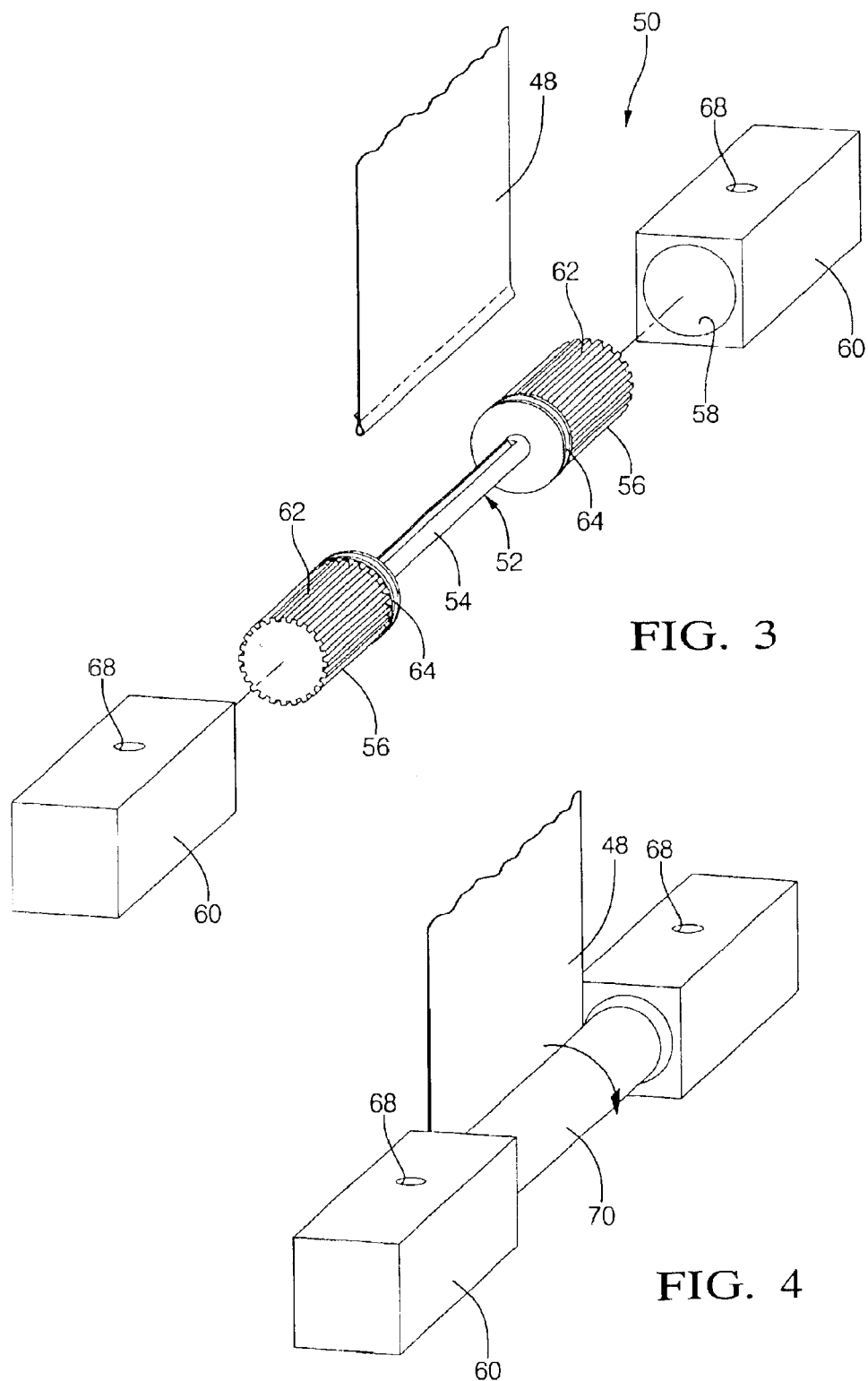

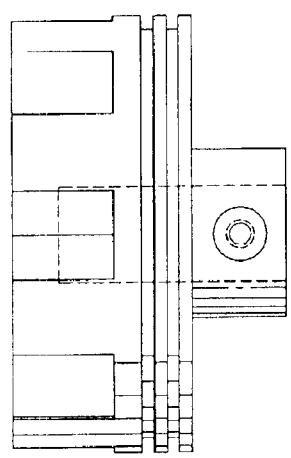
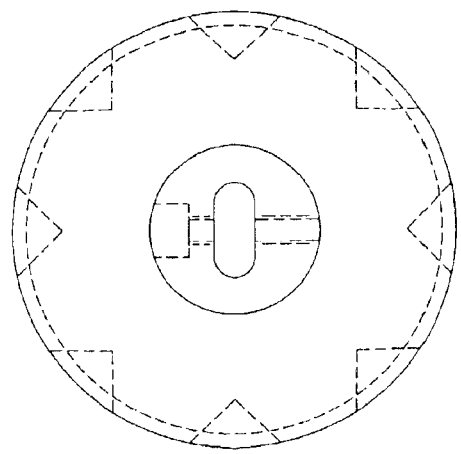
FIG. 9 A
FIG. 9 B
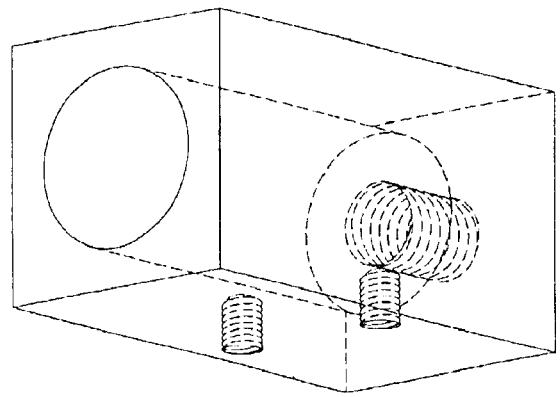
FIG. 10 A
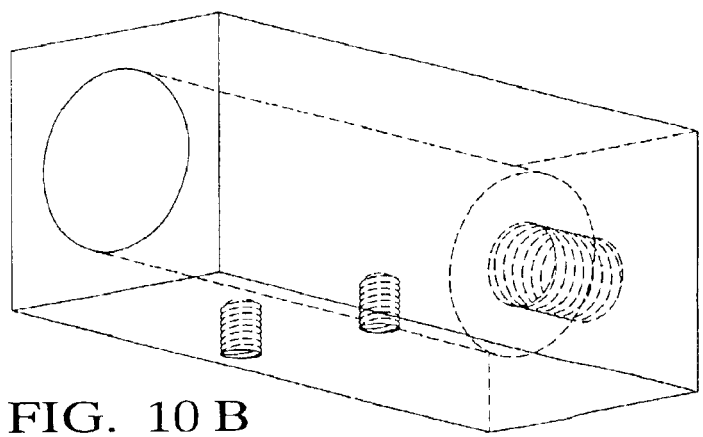
FIG. 10 B

APPARATUS AND METHOD FOR CONTROLLING AN INFLATABLE CUSHION

TECHNICAL FIELD

This disclosure relates generally to airbags for vehicles. Specifically, this disclosure relates to systems and methods for controlling the deployment of an inflatable cushion of an airbag module.

BACKGROUND

Airbag modules have become common in modern automobiles. An airbag module typically comprises an inflatable cushion and an inflator within a housing. The module is installed in a desired position within the vehicle, such as the steering wheel, the dashboard, the seat, the A-pillar, and other locations. The inflatable cushion is stored in a folded position within the housing in fluid communication with the inflator. In response to an activation event or occurrence, a sensor provides a signal for activating the inflator. The inflator provides a supply of inflating gas to the cushion to inflate the cushion, deploying it from the housing into the vehicle.

Various methods have been employed to tie the inflation level of the inflatable cushion to specific conditions. For example, dual stage inflators have been used to increase or decrease the level of inflation of the inflatable cushion. Alternatively, variable venting schemes have been used to direct a portion of a generated inflation gas away from the cushion. Further, variable tethering systems have been used to restrict or vary the overall cushion volume.

SUMMARY

An airbag module, having a housing; an inflatable cushion being stored in an un-deployed position in the housing; an inflator for inflating the inflatable cushion, the inflator being in fluid communication with the inflatable cushion; a tension device; a tether element being secured to the inflatable cushion at one end and the tension device at the other; the tension device applies tension to the tether after the inflatable cushion is inflated to a first configuration by the inflator.

A method for varying the deployment characteristics of an inflatable cushion of an airbag module, by inflating the cushion to a first configuration wherein the cushion expands in first direction and a second direction; and limiting the expansion of the cushion in a first direction by applying tension to a tether element secured to the inflatable cushion at one end and a tension producing device at the other.

A device for manipulating the deployment characteristics of an inflatable cushion of an airbag module, having a tether being secured to an interior surface of the cushion at one end and a tension producing device at the other, wherein the tether includes a slack portion that allows the cushion to expand freely until it becomes taut wherein the tension producing device limits the rate of travel of the tether by applying tension.

The above-described and other features of the present disclosure will be appreciated and understood by those skilled in the art from the following detailed description, drawings, and appended claims.

DRAWINGS

FIG. 3 is an exploded perspective view of an exemplary embodiment of the present disclosure;

FIG. 4 is a perspective view of an exemplary embodiment of the present disclosure in a first state;

FIG. 9A is a side view of an alternative component part of the embodiment illustrated in FIGS. 3–5;

FIG. 9B is an end view of the alternative component part illustrated in FIG. 9B;

DESCRIPTION OF THE EMBODIMENTS

Figure 1:
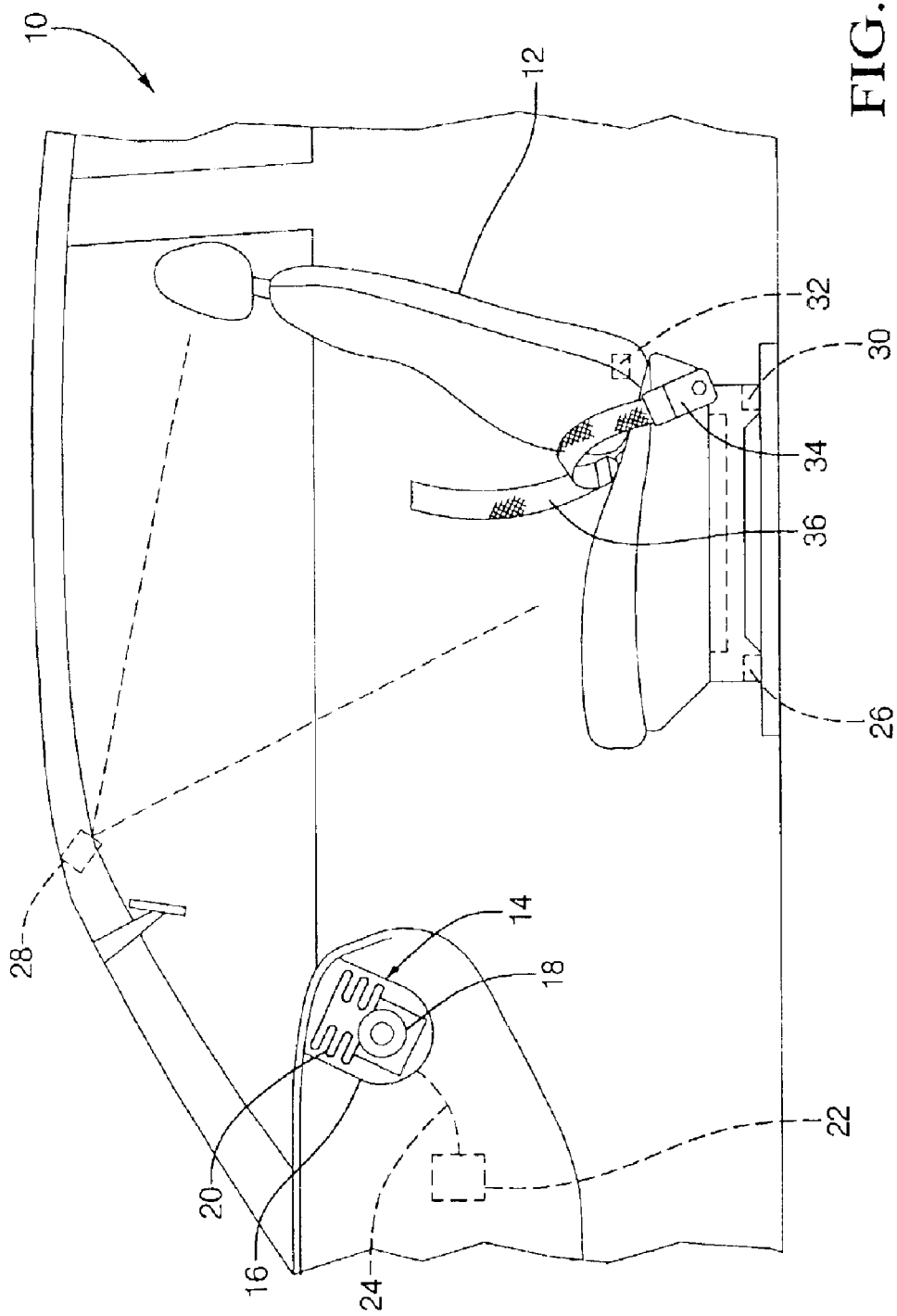
FIG. 1 is a partial view of a vehicle interior showing an airbag cushion in a stored or undeployed state.

Referring now to the Figures, and in particular to FIG. 1 a portion of an interior of a vehicle 10 is illustrated. Included in the interior compartment of vehicle 10 is a seating structure 12 and an airbag module 14 disposed in a selected spatial relationship with respect to seating structure 12. The airbag module 14 comprises a housing 16, an inflator 18, and an inflatable airbag or cushion 20. The module 14 is positioned in the vehicle 10 for deployment of the cushion 20 towards the seating structure 12.

A sensor or sensing-and-diagnostic module 22 is adapted to detect an activation event wherein the occurrence of a threshold event will cause an activation signal 24 to be generated and received by the inflator 18, thereby causing the inflator to inflate the inflatable cushion. The detection of the threshold event is determined by one or more sensors that are disposed about the vehicle in accordance with known technologies. Thus, the activation signal 24 controls the activation of the airbag module 14. Also, sensing and diagnostic module 22 is positionable anywhere with the vehicle allowing for receipt of signals from the sensors disposed about the vehicle.

The inflatable cushion is stored in a folded or undeployed position in housing 16. The cushion is positioned to be in fluid communication with the inflator 18 wherein generation of the inflating gas will cause the cushion to inflate. Upon detection of an activation event by the sensing-and-diagnostic module 22, the inflator 18 is activated via signal 24 to generate the inflation gas. The inflation gas causes the cushion 20 to inflate and expand from housing 16 into the interior of the vehicle. It should be recognized that module 14 is illustrated by way of example only as being included in the dashboard of the vehicle. Of course, it is contemplated that module 14 can be installed for deployment in other regions of the vehicle, such as, but not limited to the steering wheel, the seat, the A-pillar, the roof, and other locations as well as other angular or positional relationships illustrated in FIG. 1.

Additionally, the present disclosure is also contemplated for use with various types of inflatable cushions and inflators. For example, cushions which are folded in a particular manner to achieve various deployment configurations and various types of inflators (e.g., dual stage inflators).

In addition, and in accordance with the present disclosure, the sensing-and-diagnostic module can also be adapted to detect one or more conditions of the seating structure. For example, sensing-and-diagnostic module 22 can be adapted to detect one or more of the following: a load or amount of load (e.g., occupant weight) on the seating structure 12, a position of the seating structure, an angle of a portion of the seating structure with respect to another portion, the distance the seating structure is from the airbag module 14, and other data that is relevant to the deployment of the airbag by receiving input from a plurality of sensors disposed about the vehicle.

For example, the sensing-and-diagnostic module can receive inputs from one or more sensors such as, but not limited to, a seat position sensor 26, an optical scanner 28, a load sensor 30, a seat recline sensor 32, a seat belt use detection sensor 34, and a belt tensioning sensor (not shown). The sensors are positioned to provide input signals to module 22 indicative of one or more seat conditions. The one or more seat conditions combined with an occupant's size (e.g., weight determined by sensors) is inputted in a control algorithm resident upon a microprocessor disposed within the sensing and diagnostic module in order to determine a desired deployment scheme for the inflatable cushion.

The seat position sensor detects the position or distance of seating structure 12 with respect to airbag module 14. Similarly, the optical scanner 28 can be used to detect the position of seating structure 12. The load sensor 30 is disposed within the seating structure 12 and can be used to detect the load on the seating structure. Thus, sensor 30 is capable of detecting the specific weight or load on a portion of seating structure 12. The seat recline sensor 32 can be used to detect the degree or angle to which an upper or back portion of the seating structure 12 is reclined or positioned with respect to a lower or seat portion of seating structure 12. The seat belt use detection sensor 34 can determine whether the seat belt 36 is secured (e.g., buckled is inserted into its corresponding clasp). The seat belt tensioning sensor, alone or in combination with the load sensor 30, can also be used to determine the load on the seating structure 12.

An exemplary embodiment of an airbag module for use with the present disclosure is illustrated in FIGS. 2A–12. As will be described in detail below, airbag module 14 comprises means to customize or tailor the inflation configuration of the inflatable cushion 20.

In order to tailor the airbag inflation configuration, airbag module 14 also comprises a tether system 40 capable of providing a variable rate of tension on the tether as the airbag deploys. Alternatively, the tether system can be configured to apply a constant tension on the tether wherein a continuous force is applied by a tension device. Accordingly, the tether system is configured to adjust or modify the rearward (e.g., movement towards the seating structure 12) of the cushion.

The tether system comprises one or more tethering elements 46 connected to an inner surface of the cushion at either end, and another element 48 connected to tethering elements 46 between the end points of the tethering elements. In an exemplary embodiment the tether is constructed out of a nylon material or materials having equivalent characteristics. A portion of element 48 is wound about a tensioning device 50 that is configured to provide a varying amount or constant of tension to element 48 when the inflatable cushion is being inflated by the inflator. This tension will restrict the inward (towards vehicle seat) deployment of the inflatable cushion while allowing for lateral deployment (e.g., inboard towards vehicle center and outboard towards a side wall of the vehicle, typically the outboard direction is opposite to the inboard direction)

Alternatively, a single tether comprises tethering elements 46 and releasable element 48 and is secured to the cushion at one end and as will be described below is secured to device 50 to unfurl and provide a varying amount or constant amount of tension to the tether element when the inflatable cushion is being inflated by the inflator.

Figure 5:
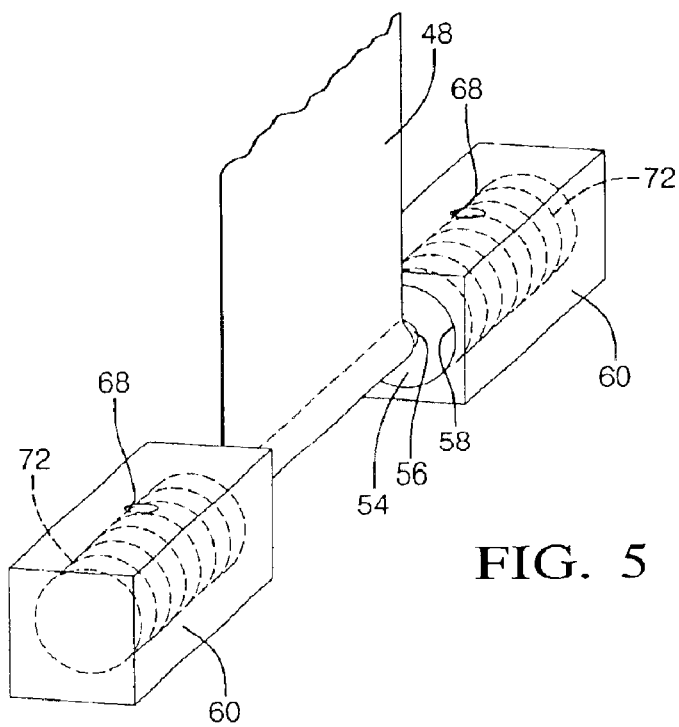
FIG. 5 is a perspective view of an exemplary embodiment of the present disclosure in a second state.

In an exemplary embodiment, and referring now to FIGS. 3–5, device 50 is illustrated. Device 50 is secured to the module housing either inside or outside in a location that allows the tether to be secured to device 50 and a portion of the inflatable cushion, preferably an interior portion of the inflatable cushion. Device 50 includes a rotatable member 52 having a shaft portion 54 and a pair of end portions 56 secured to either end of shaft portion 54. Each end portion 56 is configured to be roatably received with a corresponding receiving area 58 of a pair of end caps 60, which are secured to a portion of housing 16. Each receiving area 58 is configured to be slightly larger than end portions 56 in order to allow for rotation therein. In addition, end portions 56 are each configured to have a plurality of channels or grooves 62 disposed on the surface of end portions 56.

In the embodiment illustrated the grooves or channels traverse the surface of end portions 56 in a configuration that is perpendicular to the direction of rotation of end portions 56 with receiving area 58. Of course, the configuration (angular or otherwise) of grooves 62 with respect to end portions 56 may vary from those illustrated in the attached figures, for example and as an alternative embodiment the grooves can be configured to angularly traverse the surface of end portion 56. Also, the grooves may resemble any shape to provide the desired shear resistance (e.g., the triangular shaped grooves in FIG. 9). In addition, it is also contemplated that the surface of end portions 56 is substantially smooth while still achieving the desired shear resistance; this type of configuration is contemplated for use with higher viscosity greases.

When end portions 56 are inserted into receiving areas 58 the smaller exterior configuration of end portions 56 and the areas defined by channels 62 provides a volume for a fluid to be disposed to within receiving area 58 when end portion 56 is inserted therein.

An O-ring 64 is disposed within an annular groove 66 positioned along an exterior end of end portion 56. Once inserted within groove 66 O-ring 64 provides a means for sealing the fluid with the volume disposed about end portions 56 and receiving area 58. O-ring 64 is also configured to allow end portion 56 to rotate within receiving area 58. Alternatively, O-ring 64 is replaced by a sealing means as is known in the art which allows for rotation of end portions 56 with their respective receiving areas while maintaining the fluid within the area between end portions 56 and receiving area 58. Once end portion 56 is inserted into receiving area 58 the fluid may be inserted therein through a grease fitting 68 disposed on the exterior of the end cap. Grease fitting 68 is in fluid communication with receiving area 58.

In an assembled state element 48 or a portion of tether 46 is fixedly secured to shaft portion 54 and then wound about shaft portion 54 until a portion 70 of element 48 or tether 46 is wound about shaft portion 54. In an exemplary embodiment, portion 70 relates to an amount of the tether, which is to have a tensile force applied thereto during the deployment of the inflatable cushion. Accordingly, the application of a tensile force to portion 70 restricts the rearward excursion of the inflatable cushion without restricting the radial or cross car deployment.

Figure 2A:
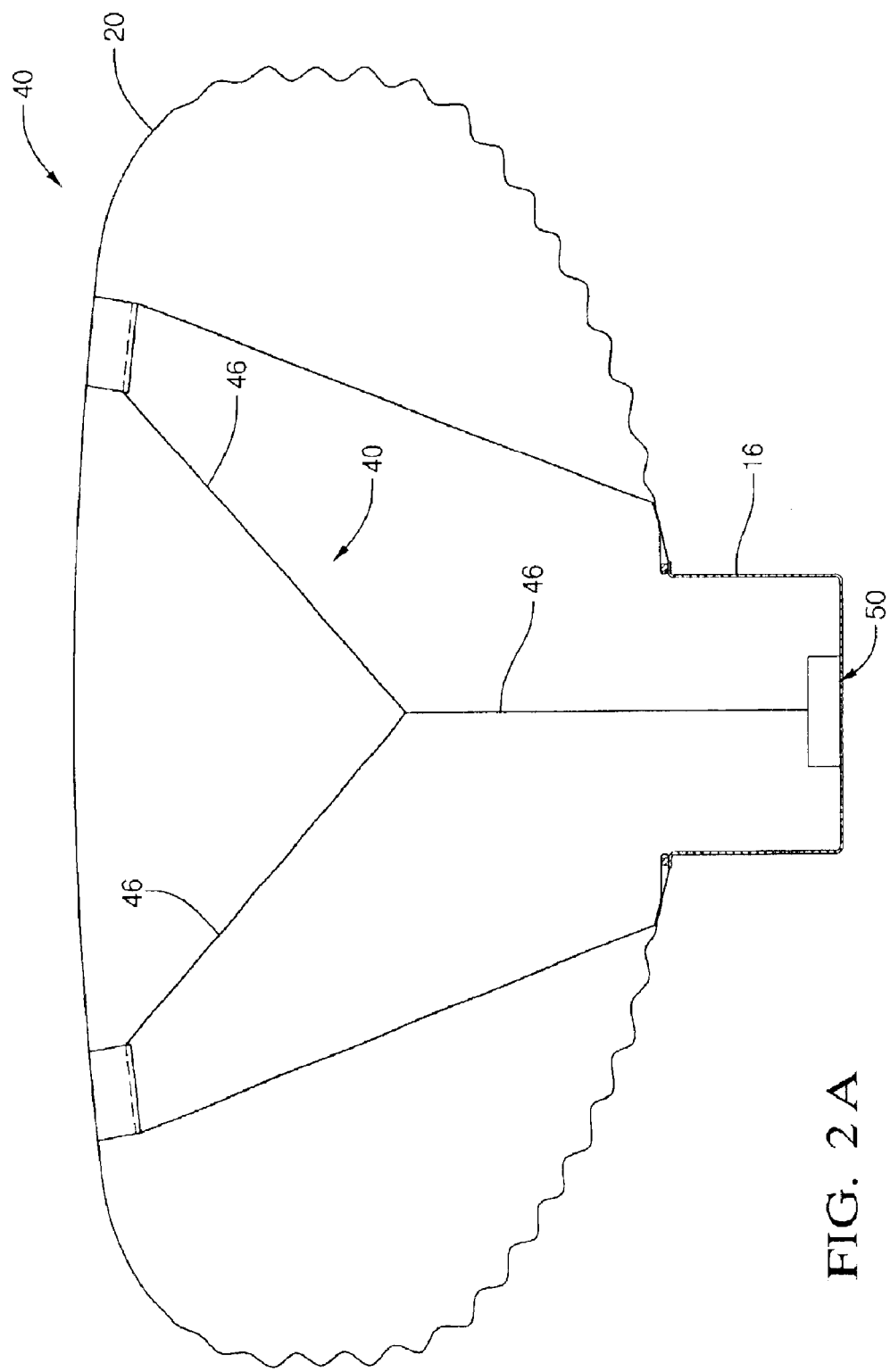
FIG. 2A illustrates an exemplary embodiment of an inflatable cushion in a first deployed state.
Figure 2:
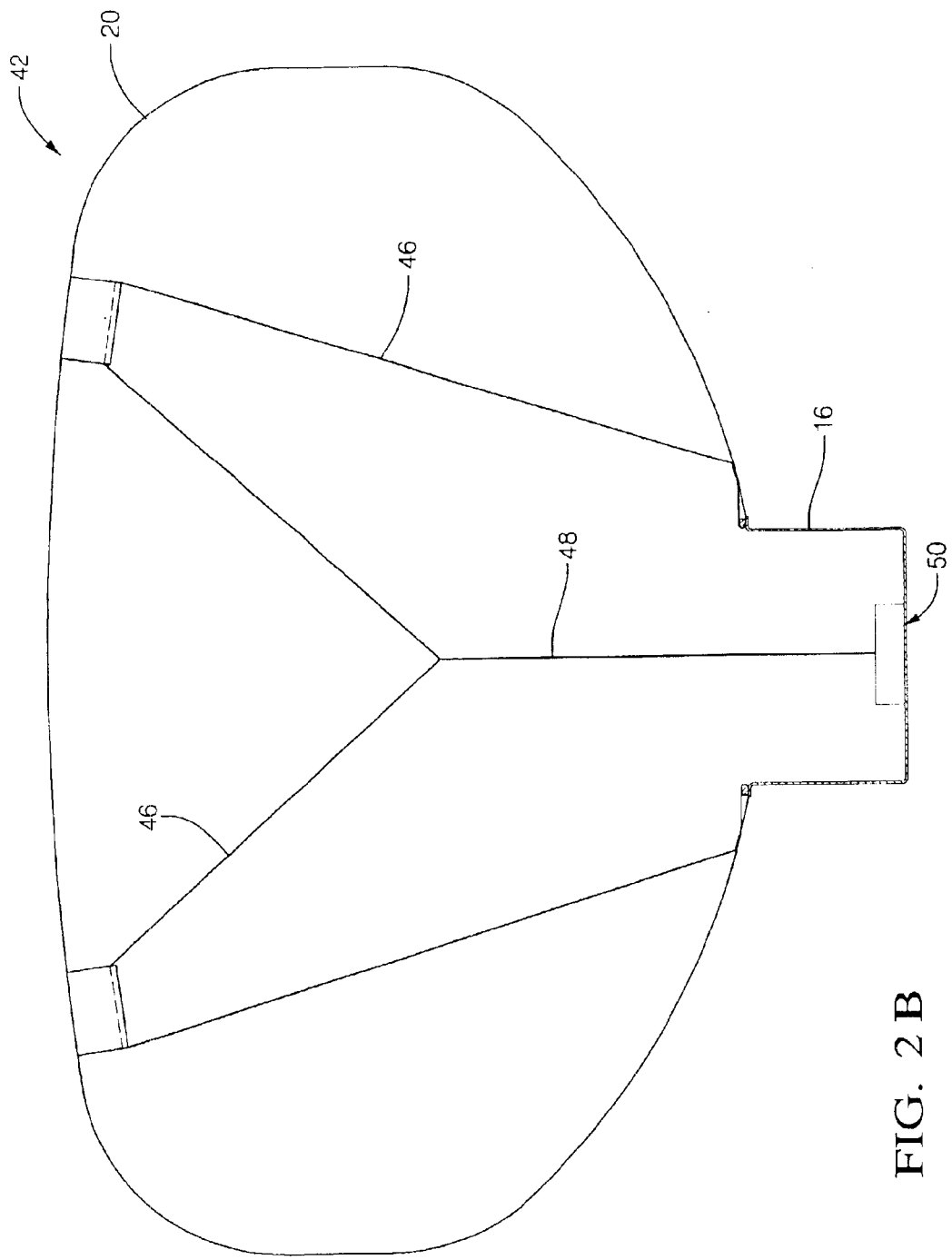
FIG. 2B illustrates an exemplary embodiment of an inflatable cushion in a second deployed state.

During a deployment event the inflator will cause the inflatable cushion to inflate and deploy out of an opening in the housing and the vehicle structure that includes the airbag module. As the inflatable cushion inflates a first length of a tether 46 (being secured to the inflatable cushion at one end and terminating at portion 70) unfurls until the first length becomes taut thereby causing portion 70 to be un-wound from shaft portion 54. An example of this first deployed state (e.g., prior to the unwinding of portion 70) is illustrated in FIG. 2A. It is noted that the configurations in FIGS. 2A and 2B are for illustration purposes only and are not intended to limit the scope of the present disclosure.

As portion 70 unfurls from shaft portion 54, end portions 56 rotate within receiving areas 58 in end caps 60. During this stage of the deployment of the inflatable cushion, the fluid within receiving areas 58 provides a counteracting force against the rotation of end portion 56 within the receiving area 58. This counteracting force in turn provides resistance or, and increasing tension to the tether as portion 70 unwinds. Accordingly, and since the other end of the tether is secured to an area of the inflatable cushion which typically deploys in a rearward direction (e.g., towards the seating structure) first, the rearward deployment of this area of the inflatable cushion is slowed, however, the deployment of the cushion in other directions (e.g., radial or cross car) is not restricted by the application of the force being applied to portion 70. This deployment configuration is illustrated in FIG. 2B.

Thus, the tether and restrictive force applied to the same, as it unfurls during deployment of the inflatable cushion, restricts or retards deployment or incursion of the inflatable cushion in certain directions within the vehicle without restricting the cushion's deployment in other directions.

Moreover, it is important to note that the unfurling of portion 70 is not prevented but merely slowed so as to slow the deployment of certain areas of the inflatable cushion while leaving others to expand in accordance with the inflation gases. FIGS. 2A and 2B are intended to provide an example of the cushion inflation dynamics that are the result of the present disclosure and the present disclosure is not intended to be limited by those illustrated in the Figures.

In an exemplary embodiment, the fluid disposed within receiving area 58 is a fluid having a viscosity (e.g., resistance to shear) that increases as the rotation or rotation of forces within the receiving area 58 increases. In an exemplary embodiment, the fluid is disposed within receiving area 58 and has a shear stress (resistance to flow) that is proportional to a shear rate (speed of motion of the fluid with respect to nearby fluid elements). Therefore, the shear stress of the fluid increases as the shear rate or rotation of end portions 56 increases. Accordingly, the faster the rotation of the end portions within the receiving areas the more resistant the fluid becomes and therefore, more tension is provided to portion 70 being unwound from shaft portion 54.

In addition, the configuration and positioning of channels 62 along the surface of end portion 56 will also add to or increase the shear stress of the fluid disposed in the receiving area.

In addition, the device and resulting forces applied to portion 70 can be tuned or varied according to design specifications by varying the diameter of the shaft portion 54, the diameter and/or configuration of end portions 56, the type of fluid used (i.e., fluid viscosity), the geometry of the grooves disposed on the surface of the end portions, the length (e.g., depth) of the end portions 56 and the corresponding receiving area 58 into which they are disposed.

Alternatively, the entire portion of the tether is wound about the shaft portion and the entire unfurling of the tether is unwound from device 50 wherein a tension is applied to the tether as it unfurls. In addition, and as the rotation of the shaft increases the shear resistance of the fluid increases and the tension applied to the tether will increase.

As an alternative the fluid and the device (end portions 56 and receiving area 58) are configured to provide a constant tension regardless of the rate of rotation of the end portion within the receiving area.

As yet another alternative, a magnetorheological fluid is disposed within receiving area 58. A magnetorheological fluid consists of magnetically soft particles suspended in a synthetic fluid. When a current is applied to an electromagnetic coil 72 disposed proximate to the magnetorheological fluid a magnetic field is generated. In this alternative the magnetic coil is disposed within or about end caps 60 in a location close enough to provide a magnetic field of a sufficient strength to obtain the desired effect from the fluid disposed between end portion 56 and receiving area 58. The resulting magnetic field changes the rheology of the fluid i.e., its resistance to flow, and thus produces a responsive and controllable damping action. An example of a magnetorheological fluid is disclosed in U.S. Pat. No. 5,683,615, the contents of which are incorporated herein by reference thereto.

As yet another alternative and in combination with the aforementioned magnetorheological fluid an onboard controller continually adjusts the resulting magnetic field and accordingly the damping forces continuously, for example, every millisecond based on input from sensors and/or accelerometers disposed about the vehicle and corresponding to vehicle conditions, including deceleration, occupant position, seat position, size of occupant and status of seat belts (i.e., clasped or un-clasped).

In this alternative, active control of the force applied by device 50 to vary the cushion deployment configuration is commensurate with specific data inputs received from the plurality of sensors and is interpreted by the control module 22. More specifically, the airbag module 14 is configured to vary the configuration of cushion 20 to different types of inflation profiles, which are initiated in response to or according to data received by sensors 26, 28, 30, 32 and 34.

For example, the data inputs when compared to a look up table stored in the memory of the microprocessor or other readable format will allow the algorithm to determine whether to tailor the airbag module's deployment by activating or not activating the tension system designed to modify the cushion's deployment characteristics.

A control algorithm will determine whether to apply or vary the magnetorheological fluid more specifically, the control algorithm will at least include a decision node that determines whether or not to activate the magnetic coil and/or vary the field strength. The decision node will at least base its decision upon the various inputs received by one or more sensors including for example, the position of seating structure 12 or other data. The inputs are detected and inputted into the algorithm by seat position sensor 26, optical scanner 28, seat recline sensor 32, and/or combinations thereof, including other vehicle sensors such as accelerometers. Accordingly, a single sensor input or alternatively a plurality of sensor inputs are used prior to the receipt of a signal indicative of an activation event to configure or modify the deployment characteristics of an airbag module prior to the deployment of the same.

The continuous sampling of the various sensors allows the sensing and diagnostic module to determine before an activation event (deployment) what type of deployment is desired. It is noted that the active tether tensioning device of the present disclosure is contemplated for use with any combination of the aforementioned sensors and it is not intended to be limited by the specific types of sensors discussed above. For example, the system is capable of operating with a single sensor input (e.g., occupant weight) or a multitude of inputs (e.g., occupant weight, seat position, seat belt operation, occupant height, etc.). Thus, any combination of sensors and sensor inputs may be used in order to assist with the deployment of the airbag.

Referring now to FIGS. 6A–11 component parts of the device illustrated in FIGS. 3–5 are illustrated. These Figures represent contemplated design configurations of component parts of device 50 and are not intended to limit the present disclosure to the specific embodiments disclosed therein.

Figure 6:
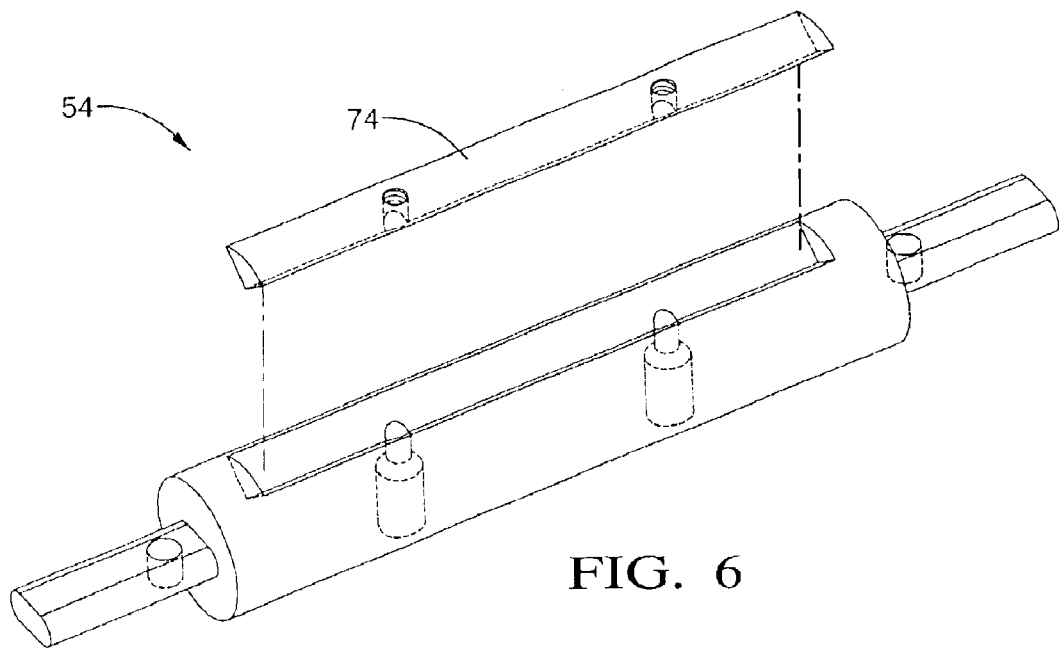
FIGS. 6 is a perspective view of a component part of the embodiment illustrated in FIGS. 3–5.
Figure 7:
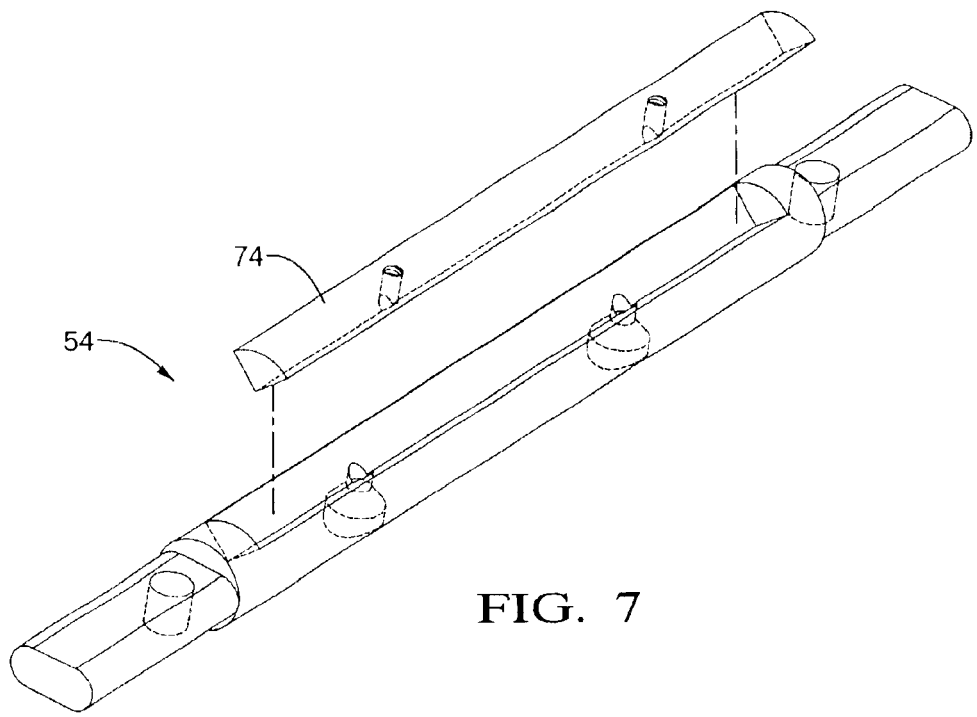
FIG. 7 is a perspective view of alternative embodiment of the FIG. 6 embodiment.

FIGS. 6A–7 relate to contemplated design configurations of shaft portion 54. Each of these designs includes a plate 74 that is configured to be received and secured to the shaft portion. Plate 74 is used to secure the tether to the shaft portion by sandwiching the same therebetween.

Figure 8:
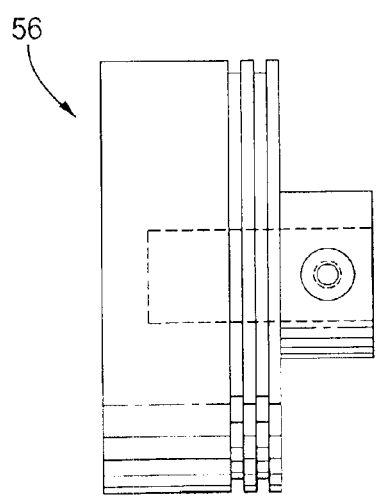
FIG. 8A is a side view of a component part of the embodiment illustrated in FIGS. 3–5.
FIG. 8B is an end view of the component part illustrated in FIG. 8A.
Figure 8:
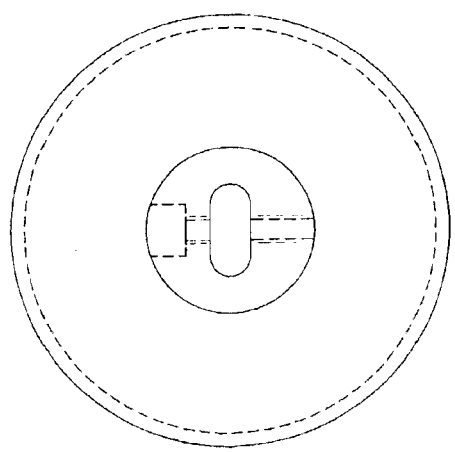
Figure 10:
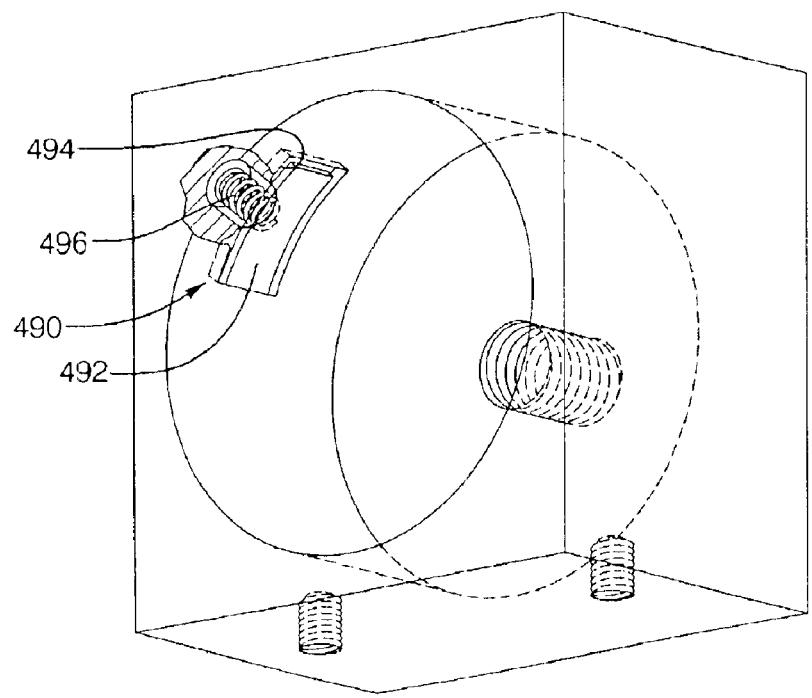
FIGS. 10A–10C illustrate alternative component parts of the embodiment illustrated in FIGS. 3–5.

FIGS. 8 and 9 illustrate potential configurations of end portions 56 that are secured to shaft portion 54.

FIGS. 10A–10C illustrate various configurations of end caps 60, wherein the dimensions of the same are varied.

Figure 11:
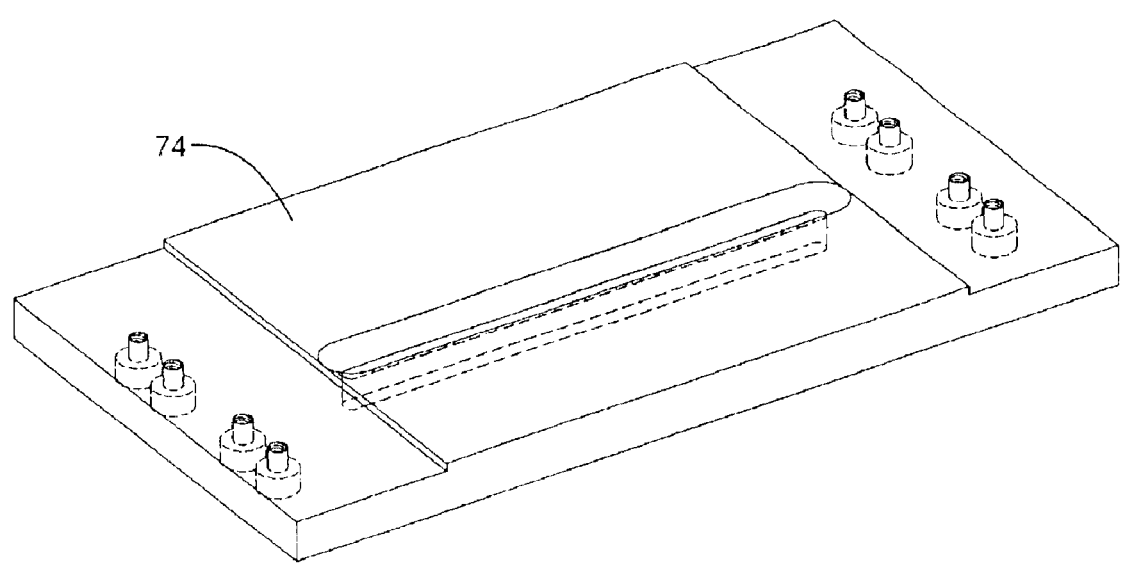
FIG. 11 is a perspective view of a component part of the embodiment illustrated in FIGS. 3–5.

FIG. 11 illustrates a base plate or cover 74 adapted to be secured to device 50 and in particular end caps 60. Cover 74 includes a central opening 76 configured to allow the tether to pass therethrough. In an alternative embodiment where device 50 is disposed on the exterior or outside the housing of the airbag module, an opening similar to opening 76 will be disposed in a housing wall to allow the tether to pass therethrough for securement to the inflatable cushion.

Figure 12:
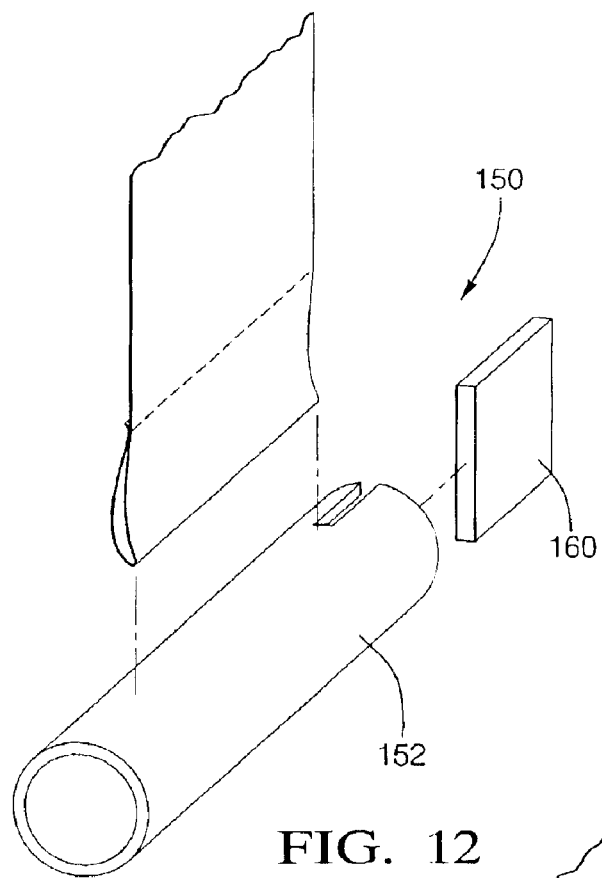
FIG. 12 illustrates an alternative embodiment of the present disclosure.
Figure 13:
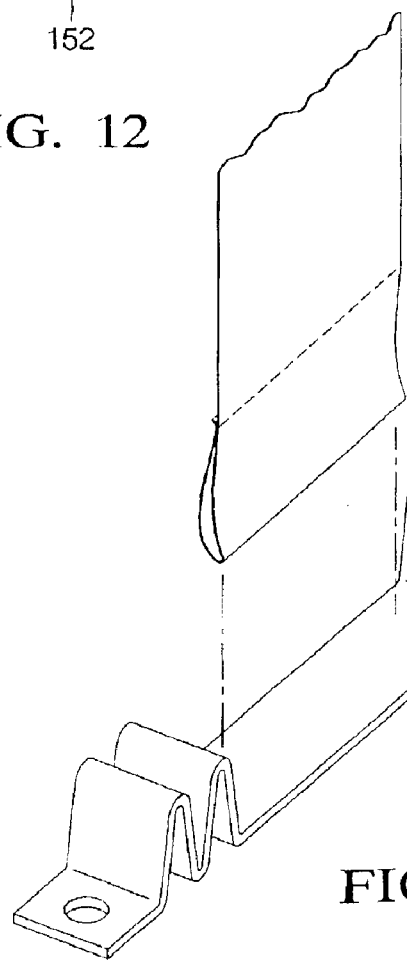
FIG. 13 illustrates another alternative embodiment of the present disclosure.
Figure 14:
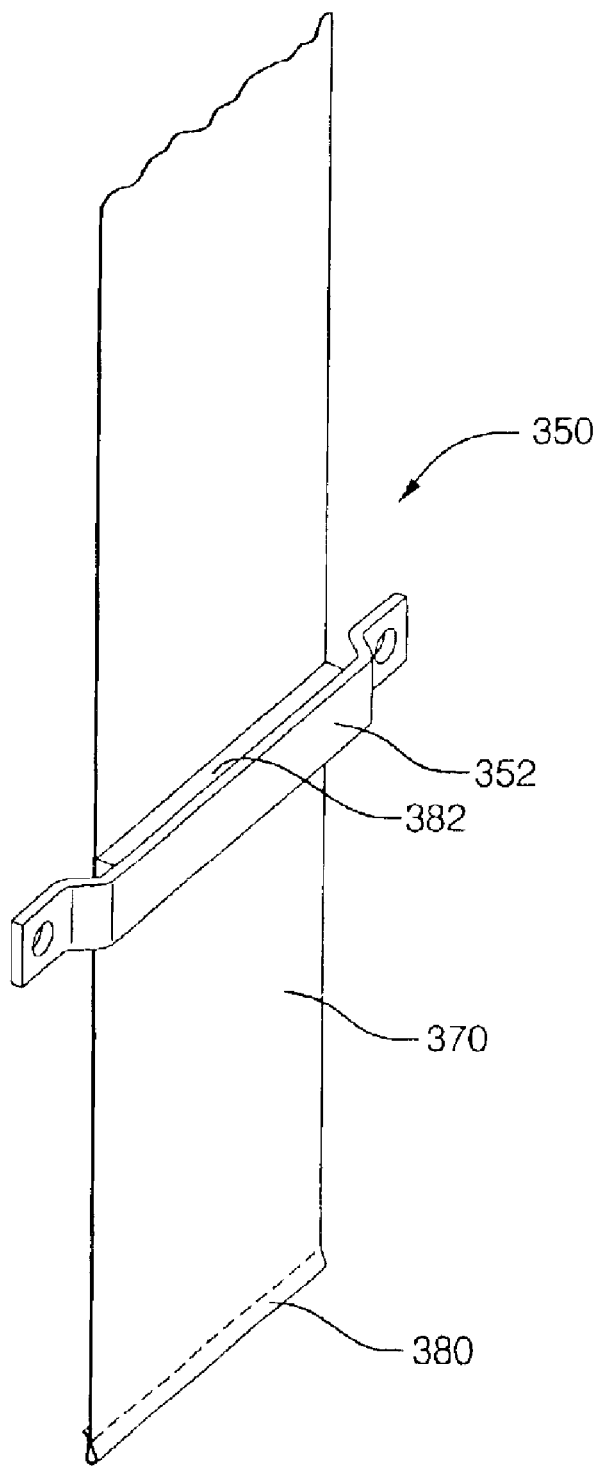
FIG. 14 illustrates yet another alternative embodiment of the present disclosure.

Referring now to FIGS. 12–14 other alternative embodiments of the present disclosure are illustrated. Here component parts performing similar or analogous functions are labeled in multiples of 100.

In FIG. 12, device 150 comprises a deformable torsion bar 152. In this embodiment a portion of the tether is wound about the torsion bar. The torsion bar is secured to the housing of the airbag module through the use of a securement plate 160. Torsion bar 152 is configured to be fixedly secured to securement plate 160 at one end and securement plate 160 is permanently secured to the housing of the airbag module. Upon deployment of the inflatable cushion a portion of the tether unfurls freely with the inflatable cushion until a desired length corresponding to a desired excursion or unmodified deployment of the cushion is reached, at this point further movement of the tether is dependent upon deformation of torsion bar 152. Accordingly, the characteristics of torsion bar 152 will apply tension to the tether and depending upon the point of securement of the other end of the tether (e.g., opposite to torsion bar 152) deployment of the inflatable cushion is retarded or restricted due to this tension while deployment in other directions is not restricted.

Accordingly, and through the restrictive forces of the tether the deployment characteristics of the inflatable cushion are modified. For example, rearward excursion of the inflatable cushion is limited while radial or lateral (cross car) deployment is not restricted. In accordance with the present disclosure device 150 and torsion bar 152 are secured to the housing of the inflatable cushion and the airbag module is configured to allow the tether to be secured to the torsion bar at one end and a portion of the inflatable cushion at the other end (preferably an interior surface of the inflatable cushion). Thus, the tether will pass through the inflation opening of the inflatable cushion, which is configured to receive the inflation gases of the inflator. Alternatively, the tether will pass through another opening in the inflatable cushion.

Referring now to FIG. 13, another alternative embodiment is illustrated. Here device 250 comprises a deformable bracket 252 that is secured to the housing of the airbag module. As described above and upon deployment of the inflatable cushion a portion of the tether unfurls freely with the inflatable cushion until a desired length corresponding to a desired excursion or unmodified deployment of the cushion is reached, at this point further movement of the tether is dependent upon the deformation of deformable bracket 252. Accordingly, the characteristics of deformable bracket 252 will apply tension to the tether and depending upon the point of securement of the other end of the tether (e.g., opposite to deformable bracket 252) deployment of the inflatable cushion is retarded or restricted while deployment in other directions is not restricted. In an exemplary embodiment deformable bracket 252 is made out of a metal material such as aluminum or steel and equivalents thereof which will be deformable so as to apply the required tension to the tether.

Referring now to FIG. 14, yet another alternative embodiment is illustrated. Here device 350 comprises a retaining bracket 352 that is secured to a surface of the housing of the airbag module. In this embodiment the tether is secured between the housing surface and the retaining bracket. The retaining bracket is configured to secure the tether between the two surfaces yet allows for the same to slide therebetween. As described above and upon deployment of the inflatable cushion a portion of the tether unfurls freely with the inflatable cushion until a desired length corresponding to a desired excursion or unmodified deployment of the cushion is reached, at this point further movement of the tether is dependent upon a portion 370 which is positioned to slide through retaining bracket 352. The proximity of retaining bracket 352 to the surface of the airbag module housing will apply a frictional force to portion 370 as it slides between retaining bracket 352 and the housing. This frictional force will apply tension to the tether and depending upon the point of securement of the other end of the tether (e.g., opposite to retaining bracket 352) deployment of the inflatable cushion is retarded or restricted while deployment in other directions is not restricted. In order to prevent the tether from completely sliding away from the retaining bracket, an enlarged or thickened portion 380 is disposed at the end of the tether.

As an alternative, and in order to apply friction to portion 370 as it is slid between retaining bracket 352 and the housing wall, a frictional plate 382 is disposed on a surface of the retaining bracket, which makes contact with the tether. As yet another alternative, the frictional plate is disposed on the surface of the housing in a position to make contact with the tether or alternatively frictional plates are disposed on both the housing wall and the retaining bracket.

Referring back now to FIG. 10C another alternative embodiment is illustrated. Here a braking device 490 is disposed to make contact with the surface of the end portions as they rotate within the end caps. For example, a braking pad 492 can be disposed within a receiving area 494 disposed on the inner surface of the opening of the end cap. Braking pad 492 can be biased inwardly by a spring 496 configured and positioned to provide an inward biasing force to pad 492. In this embodiment the braking device provides a constant resistance to the surface of the end portion as it rotates within the end cap. In yet another embodiment braking pad 492 is or is positioned on a material capable of providing the aforementioned biasing force without the use of a spring. It is of course contemplated that braking device 490 can be used with any of the applicable embodiments of the present disclosure.

In yet another embodiment, the end portions are configured to have an interference fit within the openings of the end caps. In this embodiment the desired resistance is provided by the frictional interference as the end portion is rotating with the opening defined in the end cap.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An airbag module, comprising:
    a housing;
    an inflatable cushion being stored in an un-deployed position in said housing;
    an inflator for inflating said inflatable cushion, said inflator being in fluid communication with said inflatable cushion;
    a tension device;
    a tether element being secured to said inflatable cushion at one end and said tension device at the other, said tension device comprising: a shaft portion having end portions disposed on either end of said shaft, said end portions being configured to be rotatably received within a receiving area of a pair of end caps; and a fluid disposed between said end portions and said receiving areas, said fluid having a shear stress that increases as said end portions are rotated within said receiving areas, wherein a portion of said tether is wound about said shaft when said inflatable cushion is in said un-deployed position and said tether allows the inflatable cushion to expand freely until said portion of said tether is unwound from said shaft;
    wherein said tension device applies tension to said tether after said inflatable cushion is inflated to a first configuration by said inflator.

2. The airbag module as in claim 1, wherein said inflatable cushion inflates to a second configuration after said tension device applies tension to said tether, said second configuration having a greater deployment proportion in a first direction with respect to said first configuration.

3. The airbag module as in claim 2, wherein said first direction corresponds to a radial direction of the inflatable cushion.

4. A device for manipulating the deployment characteristics of an inflatable cushion of an airbag module, comprising:
    a tether being secured to an interior surface of the cushion at one end and a rotatable member at the other, a portion of said tether is wound about said rotatable member, wherein said rotatable member comprises: a shaft portion having end portions disposed on either end of said shaft, said end portions being configured to be rotatably received within a receiving area of a pair of end caps; and a fluid disposed between said end portions and said receiving areas, said fluid having a shear stress that is increases as said end portions are rotated within said receiving areas; and
    wherein said tether allows the cushion to expand freely until said portion of said tether is unwound from said rotatable member.

5. The device as in claim 4, wherein said end caps are secured to the airbag module.

6. The device as in claim 4, wherein said device further comprises a cover secured to said pair of end caps, said cover having an opening configured to allow said tether to pass therethrough.

7. The device as in claim 4, wherein said fluid is a magnetorheological fluid and said device further comprises an electromagnetic coil disposed proximate to said magnetorheological fluid, said electromagnetic coil being configured to generate a magnetic field of a sufficient strength to change the rheology of the fluid by making it more resistant to flow.

8. The device as in claim 7, wherein said electromagnetic coil is activated by a sensing and diagnostic module adapted to receive and interpret signals from a plurality of sensors disposed about a vehicle having the airbag module installed therein.

9. The device as in claim 4, wherein said rotatable member applies tension to said tether after the inflatable cushion is inflated to a first configuration, the inflatable cushion expands to a second configuration after said rotatable member applies tension to said tether, said second configuration having a greater deployment proportion in a first direction with respect to said first configuration.

10. The device as in claim 4, wherein said first direction corresponds to a radial direction of the inflatable cushion.

11. A device for manipulating the deployment characteristics of an inflatable cushion of an airbag module, comprising:
    a tether being secured to an interior surface of the cushion at one end and tension producing device at the other, said tether having a slack portion disposed between the cushion and said tension producing device;
    wherein said slack portion allows the cushion to expand freely during deployment until said slack portion becomes taut wherein said tension producing device allows further deployment of said tether at a slower rate than said slack portion, wherein said tension producing device is a torsion bar configured to deform upon the application of a force to said torsion bar by said tether, said torsion bar being secured to the airbag module.

12. The device as in claim 11, wherein said tension device applies tension to said tether after the inflatable cushion is inflated to a first configuration, the inflatable cushion expands to a second configuration after said tension device applies tension to said tether, said second configuration having a greater deployment proportion in a first direction with respect to said first configuration.

13. The device as in claim 12, wherein said first direction corresponds to a radial direction of the inflatable cushion.

14. A device for manipulating the deployment characteristics of an inflatable cushion of an airbag module, comprising:

a tether being secured to an interior surface of the cushion at one end and tension producing device at the other, said tether having a slack portion disposed between the cushion and said tension producing device; wherein said slack portion allows the cushion to expand freely during deployment until said slack portion becomes taut wherein said tension producing device allows further deployment of said tether at a slower rate than said slack portion, wherein said tension producing device is a deformable bracket configured to deform upon the application of a force to said deformable bracket by said tether, said deformable bracket being secured to the airbag module.

15. A device for manipulating the deployment characteristics of an inflatable cushion of an airbag module, comprising:

a tether being secured to an interior surface of the cushion at one end and tension producing device at the other, said tether having a slack portion disposed between the cushion and said tension producing device; wherein said slack portion allows the cushion to expand freely during deployment until said slack portion becomes taut wherein said tension producing device allows further deployment of said tether at a slower rate than said slack portion, wherein said tension producing device is a retaining member configured to slidably retain said tether between the airbag module and said retaining member and said tension producing device further comprises a friction plate disposed between said retaining member and said tether.

16. An airbag module, comprising:

a housing;

an inflatable cushion being stored in an un-deployed position in said housing;

an inflator for inflating said inflatable cushion, said inflator being in fluid communication with said inflatable cushion;

a tether element being secured to said inflatable cushion at one end and a rotatable member at the other end, said rotatable member having at least one end portion disposed in a fluid having a shear stress that increases as said at least one end portion is rotated within said fluid, wherein a portion of said tether element is wound about said rotatable member when said inflatable cushion is in said un-deployed position and wherein said tether element allows the inflatable cushion to expand freely until said portion of said tether element is unwound from said rotatable element, wherein said rotatable member provides tension to said tether element after said inflatable cushion is inflated to a first configuration by said inflator.

17. A method for varying the deployment characteristics of an inflatable cushion of an airbag module, comprising:

inflating the cushion to a first configuration wherein the cushion expands in a first direction and a second direction; and limiting the expansion of the cushion in the first direction by applying tension to a tether element secured to the inflatable cushion at one end and a tension producing device at the other, wherein said tension producing device comprises: a rotatable member having at least one end portion disposed in a fluid having a shear stress that increases as said at least one end portion is rotated within said fluid, wherein a portion of said tether element is wound about said rotatable member when the inflatable cushion is in an un-inflated configuration and wherein said tether element allows the inflatable cushion to inflate freely until said portion of said tether element is unwound from said rotatable element, wherein said rotatable member provides tension to said tether element as said portion is unwound from said rotatable member.

* * * * *